US012559225B1

(12) United States Patent
Whittington et al.

(10) Patent No.: US 12,559,225 B1
(45) Date of Patent: Feb. 24, 2026

(54) RUDDER SYSTEM FOR AN AIRCRAFT

(71) Applicant: THE BOEING COMPANY, Arlington, VA (US)

(72) Inventors: Seth Alan Whittington, Bothell, WA (US); Joseph E. Elliott, Shoreline, WA (US)

(73) Assignee: THE BOEING COMPANY, Arlington, VA (US)

( * ) Notice: Subject to any disclaimer, the term of this patent is extended or adjusted under 35 U.S.C. 154(b) by 65 days.

(21) Appl. No.: 18/819,765

(22) Filed: Aug. 29, 2024

(51) Int. Cl.
 *B64C 13/04* (2006.01)

(52) U.S. Cl.
 CPC .................................... *B64C 13/044* (2018.01)

(58) Field of Classification Search
 CPC .................................................... B64C 13/044
 See application file for complete search history.

(56) References Cited

U.S. PATENT DOCUMENTS

| | | | | |
|---|---|---|---|---|
| 6,981,409 B2 * | 1/2006 | Huynh | ...................... | G01L 5/22 |
| | | | | 73/862.01 |
| 7,559,510 B1 * | 7/2009 | Bae | ...................... | B64C 13/345 |
| | | | | 244/99.2 |
| 2011/0108674 A1 * | 5/2011 | Gardner | ................ | B64C 13/044 |
| | | | | 244/235 |
| 2021/0129975 A1 * | 5/2021 | Voiles | ...................... | B64C 13/50 |

FOREIGN PATENT DOCUMENTS

| | | | | | |
|---|---|---|---|---|---|
| CN | 110654531 A | * | 1/2020 | ............. | B64C 13/46 |
| CN | 114104269 B | * | 5/2022 | ........... | B64C 13/044 |
| CN | 117262205 A | * | 12/2023 | ........... | B64C 13/044 |
| EP | 4025495 B1 | * | 4/2024 | ........... | B64C 13/044 |
| EP | 3939882 B1 | * | 10/2024 | ............. | B64C 13/04 |
| KR | 100298262 B1 | * | 11/2002 | ............. | B64C 13/24 |
| WO | WO-2014075023 A1 | * | 5/2014 | ............. | B64C 13/04 |
| WO | WO-2023138227 A1 | * | 7/2023 | ........... | B64C 13/044 |

* cited by examiner

*Primary Examiner* — Justin M Benedik

(74) *Attorney, Agent, or Firm* — Moore IP Law

(57) ABSTRACT

A rudder system of an aircraft includes a first shaft assembly and a second shaft assembly. Each of the first shaft assembly and the second shaft assembly includes a shaft, a trim crank coupled to the shaft, and a pedal crank. The trim crank is configured such that rotation of the trim crank causes rotation of the shaft, and pedal crank is configured such that rotation of the pedal crank causes rotation of the shaft without rotation of the trim crank. The rudder system includes a pedal input link configured to couple the pedal crank of the first shaft assembly and the pedal crank of the second shaft assembly together. The rudder system also includes a rudder trim link configured to couple the trim crank of the first shaft assembly and the trim crank of the second shaft assembly together.

20 Claims, 9 Drawing Sheets

100

148

114B

146

136

304

130

306

138

112

402

150

128

152

154

142

402

114A

136

600

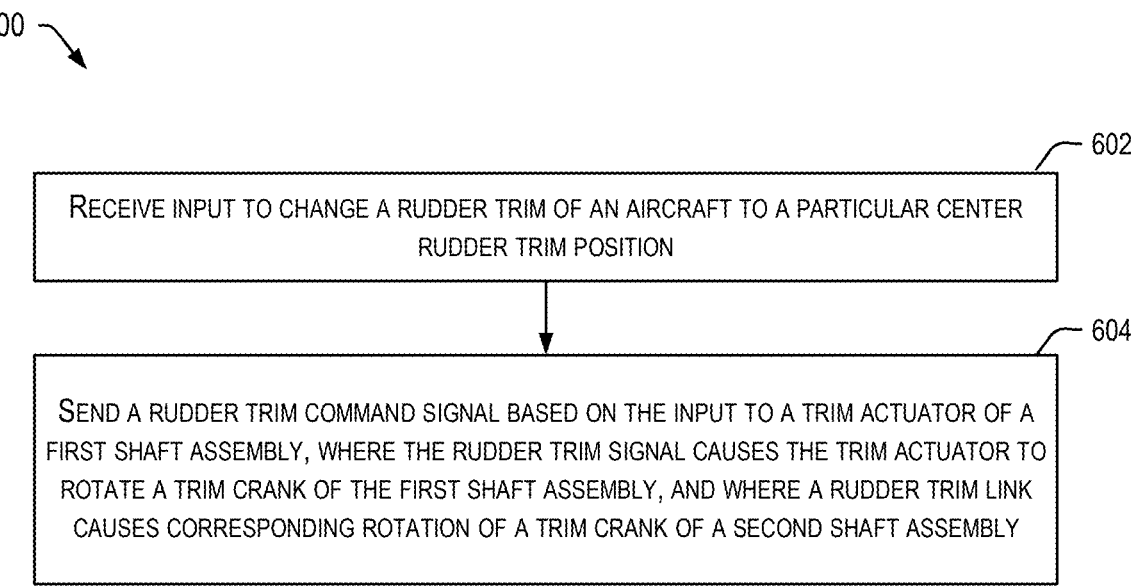

602

RECEIVE INPUT TO CHANGE A RUDDER TRIM OF AN AIRCRAFT TO A PARTICULAR CENTER RUDDER TRIM POSITION

604

SEND A RUDDER TRIM COMMAND SIGNAL BASED ON THE INPUT TO A TRIM ACTUATOR OF A FIRST SHAFT ASSEMBLY, WHERE THE RUDDER TRIM SIGNAL CAUSES THE TRIM ACTUATOR TO ROTATE A TRIM CRANK OF THE FIRST SHAFT ASSEMBLY, AND WHERE A RUDDER TRIM LINK CAUSES CORRESPONDING ROTATION OF A TRIM CRANK OF A SECOND SHAFT ASSEMBLY

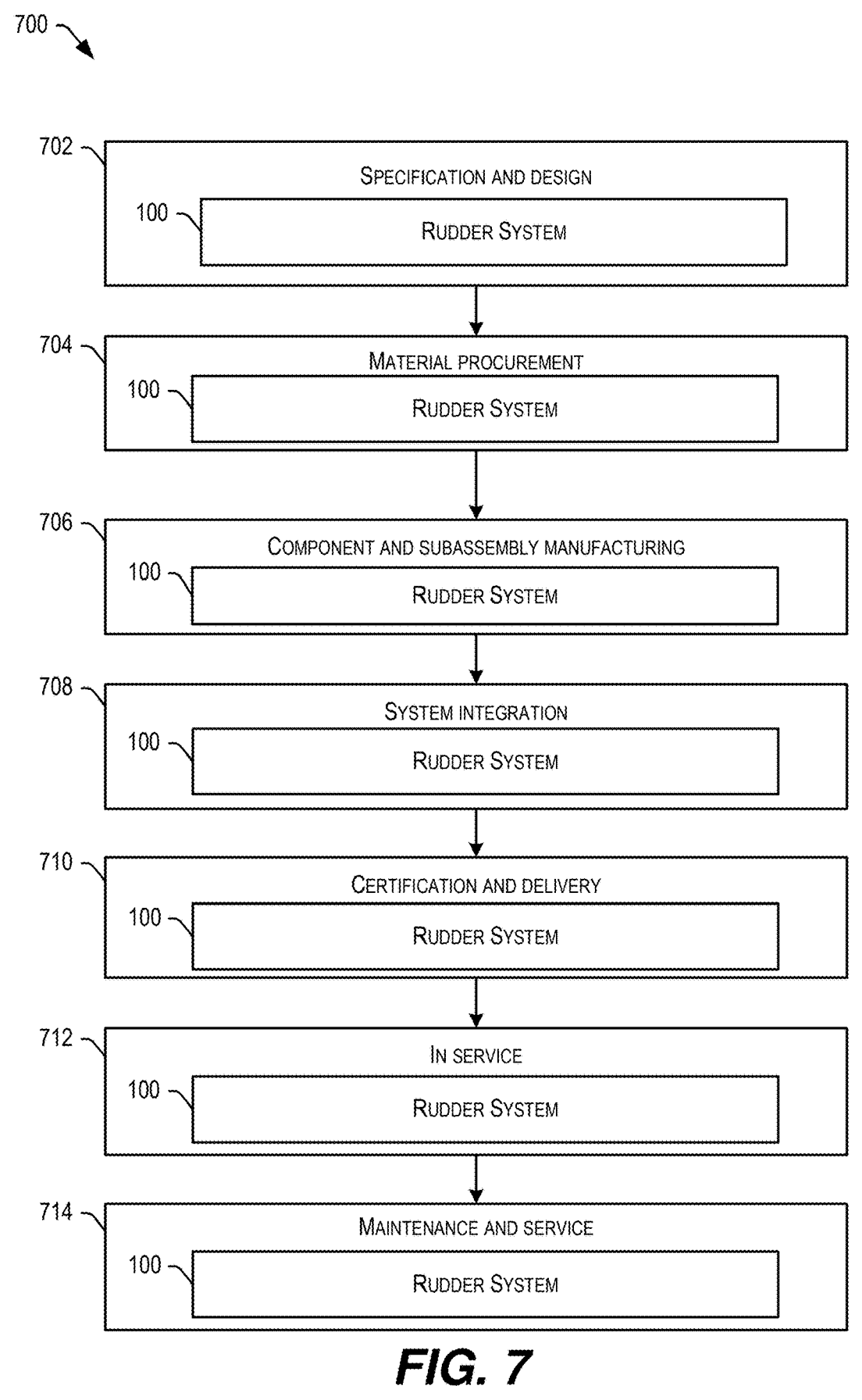

SPECIFICATION AND DESIGN

100

RUDDER SYSTEM

704

MATERIAL PROCUREMENT

100

RUDDER SYSTEM

706

COMPONENT AND SUBASSEMBLY MANUFACTURING

100

RUDDER SYSTEM

708

SYSTEM INTEGRATION

100

RUDDER SYSTEM

710

CERTIFICATION AND DELIVERY

100

RUDDER SYSTEM

712

IN SERVICE

100

RUDDER SYSTEM

714

MAINTENANCE AND SERVICE

100

RUDDER SYSTEM

*FIG. 7*

RUDDER SYSTEM FOR AN AIRCRAFT

FIELD OF THE DISCLOSURE

The present disclosure is generally related to a rudder system for an aircraft.

BACKGROUND

Some aircraft use electrically signaled primary flight control systems commonly referred to as "fly-by-wire" control systems to manipulate control surfaces (e.g., a rudder, ailerons, and elevators) used to maneuver the aircraft. A fly-by-wire control system does not include direct mechanical linkages or control cables between the control surfaces and corresponding pilot interfaces operable by pilot input (e.g., rudder pedals, control wheels, and control columns).

In response to pilot input via one or more pilot interfaces to control one or more control surfaces for some fly-by-wire systems, position sensors provide input signals corresponding to the pilot input via the one or more pilot interfaces to a control system. The control system determines command signals for one or more actuators coupled to the one or more control surfaces, and the control system sends the command signals to the one or more actuators to cause movement of the one or more control surfaces. Similarly, in response to autopilot input from an autopilot system to control one or more control surfaces for some fly-by-wire systems, the control system determines command signals corresponding to the autopilot input for one or more actuators coupled to the one or more control surfaces, and the control system sends the command signals to the one or more actuators to cause movement of the one or more control surfaces.

A rudder system for rudder control of an aircraft piloted by a first pilot (e.g., a pilot or captain) and a second pilot (e.g., a copilot or first officer) includes a first set of rudder pedals for the first pilot and a second set of rudder pedals for the second pilot. A pilot uses the rudder pedals to change a position of the rudder to the left of a rudder trim position by pushing a left rudder pedal or to the right of the rudder trim position by pushing a right rudder pedal to facilitate directional control of the aircraft. The autopilot system of the aircraft is also able to change the rudder position.

Each set of rudder pedals includes a left pedal and a right pedal that are interconnected so that when a pilot pushes the right pedal in a first direction, the left pedal moves in a second direction opposite to the first direction, and vice versa. The first set of rudder pedals and the second set of rudder pedals are also interconnected by a rudder pedal link so that when the first pilot, or the second pilot, pushes a pedal a particular distance in the first direction, the corresponding pedal for the second pilot, or the first pilot, moves the particular distance in the first direction. In addition to being components of the rudder system, the pedals are components of a braking system for landing gear of the aircraft.

In some implementations, the first set of rudder pedals are coupled to a first shaft assembly and the second set of rudder pedals are coupled to a second shaft assembly. The first shaft assembly includes a centering unit and a rudder trim actuator that the second shaft assembly does not include. The centering unit includes springs. One of the shaft assemblies includes a friction brake that provides a base level of resistance to movement of the pedals, a pedal damper to inhibit oscillation of the pedals due to the springs of the centering unit, or both. When one of the pilots applies a first force to move one of the pedals in the first direction (e.g., away from the pilot), movement of the pedal causes a second force to be applied to the springs that resists movement of the pedal due to the first force. The resistance, which increases as the pedal is moved farther by the pilot, provides a sense of feel through the pedal to the pilot, and the corresponding pedal associated with the other pilot, that enables the pilots to know that the rudder system has been commanded to move the rudder from the rudder trim position (e.g., the rudder has been commanded nose right or nose left from the rudder trim position). When the pilot eases the first force applied to the pedal, the pedals adjust to a new position and the springs cause rotation of the shaft assemblies and corresponding movement of the rudder back toward the rudder trim position to a particular position corresponding to the new position of the pedals. The rudder trim position may be a zero-degree of rudder trim position where the rudder is aligned with a longitudinal axis of the aircraft or may be a particular number of degrees, up to a maximum (e.g., seventeen degrees or some other limit), either nose right or nose left. The rudder trim position may be changed via the rudder trim actuator by pilot input via instrument controls or by command from the autopilot system.

Although unlikely to occur, it is possible for the rudder pedal link to disconnect or fail. If such an event occurs during a flight when the second pilot is applying the first force to the pedal, the second pilot would likely drive the pedal as far as it can go due to loss of the resistance provided by the springs of the centering unit and the centering unit will return the first shaft assembly to a position corresponding to the rudder trim position, which could cause a significant unwanted rudder change. If such an event occurs during a flight when the second pilot is not applying the first force, subsequent input to the rudder system from the second pilot via the second set of pedals and the second shaft assembly would be making rudder control inputs with very little feel indication, with no automatic return of the pedals to the position corresponding to the rudder trim position with no corresponding automatic movement of the rudder to the rudder trim position, and with no indication to the second pilot of the trim position via the position of the right pedal and left pedal when the second pilot is not applying force to either pedal. Such an event would increase flight crew workload, reduce controllability of the aircraft, and would result in a need to transfer control of the rudder to the first pilot while the second pilot places their feet on the second set of pedals to inhibit rudder position change due to movement of either pedal of the second set of pedals for the remainder of the flight.

SUMMARY

According to one implementation of the present disclosure, a rudder system of an aircraft includes a first shaft assembly and a second shaft assembly. Each of the first shaft assembly and the second shaft assembly includes a shaft, a trim crank coupled to the shaft, a centering unit, and a pedal crank. The trim crank is configured such that rotation of the trim crank causes rotation of the shaft, and the pedal crank is configured such that rotation of the pedal crank causes rotation of the shaft without rotation of the trim crank. The rudder system includes a pedal input link configured to couple the pedal crank of the first shaft assembly and the pedal crank of the second shaft assembly together. The rudder system also includes a rudder trim link configured to couple the trim crank of the first shaft assembly and the trim crank of the second shaft assembly together.

According to another implementation of the present disclosure, an aircraft includes a first shaft assembly and a second shaft assembly. Each of the first shaft assembly and the second shaft assembly includes a shaft, a trim crank coupled to the shaft, and a pedal crank. The trim crank is configured such that rotation of the trim crank causes rotation of the shaft, and the pedal crank is configured such that rotation of the pedal crank causes rotation of the shaft without rotation of the trim crank. The aircraft includes a pedal input link configured to couple the pedal crank of the first shaft assembly and the pedal crank of the second shaft assembly together. The aircraft includes a rudder trim link configured to couple the trim crank of the first shaft assembly and the trim crank of the second shaft assembly together. The aircraft also includes a control system configured to receive first output from one or more sensors of the first shaft assembly, receive second output from one or more sensors of the second shaft assembly, and cause a rudder command signal to be sent to one or more rudder control actuators to adjust a position of a rudder of the aircraft based on the first signals and the second signals.

According to another implementation of the present disclosure, a method for rudder control of an aircraft includes receiving input, at a control system, to change rudder trim of the aircraft to a particular rudder trim position. The method also includes sending a rudder trim command signal from the control system to a rudder trim link to cause the rudder trim link to rotate a trim crank of a first shaft assembly to a trim position corresponding to the particular rudder trim position and a trim crank of a second shaft assembly to the trim position. Each of the first shaft assembly and the second shaft assembly include a shaft, the trim crank coupled to the shaft, a pedal crank coupled to the shaft, and a pedal input link configured to couple the pedal crank of the first shaft assembly and the pedal crank of the second shaft assembly together. Rotation of the pedal crank causes rotation of the shaft without rotation of the trim crank.

The features, functions, and advantages described herein can be achieved independently in various implementations or may be combined in yet other implementations, further details of which can be found with reference to the following description and drawings.

BRIEF DESCRIPTION OF THE DRAWINGS

FIG. 6 is a flowchart of an example of a method for rudder control of an aircraft.
FIG. 7 is a flowchart illustrating an example of a life cycle of an aircraft that includes a rudder system of FIG. 1.

DETAILED DESCRIPTION

Figure 1:
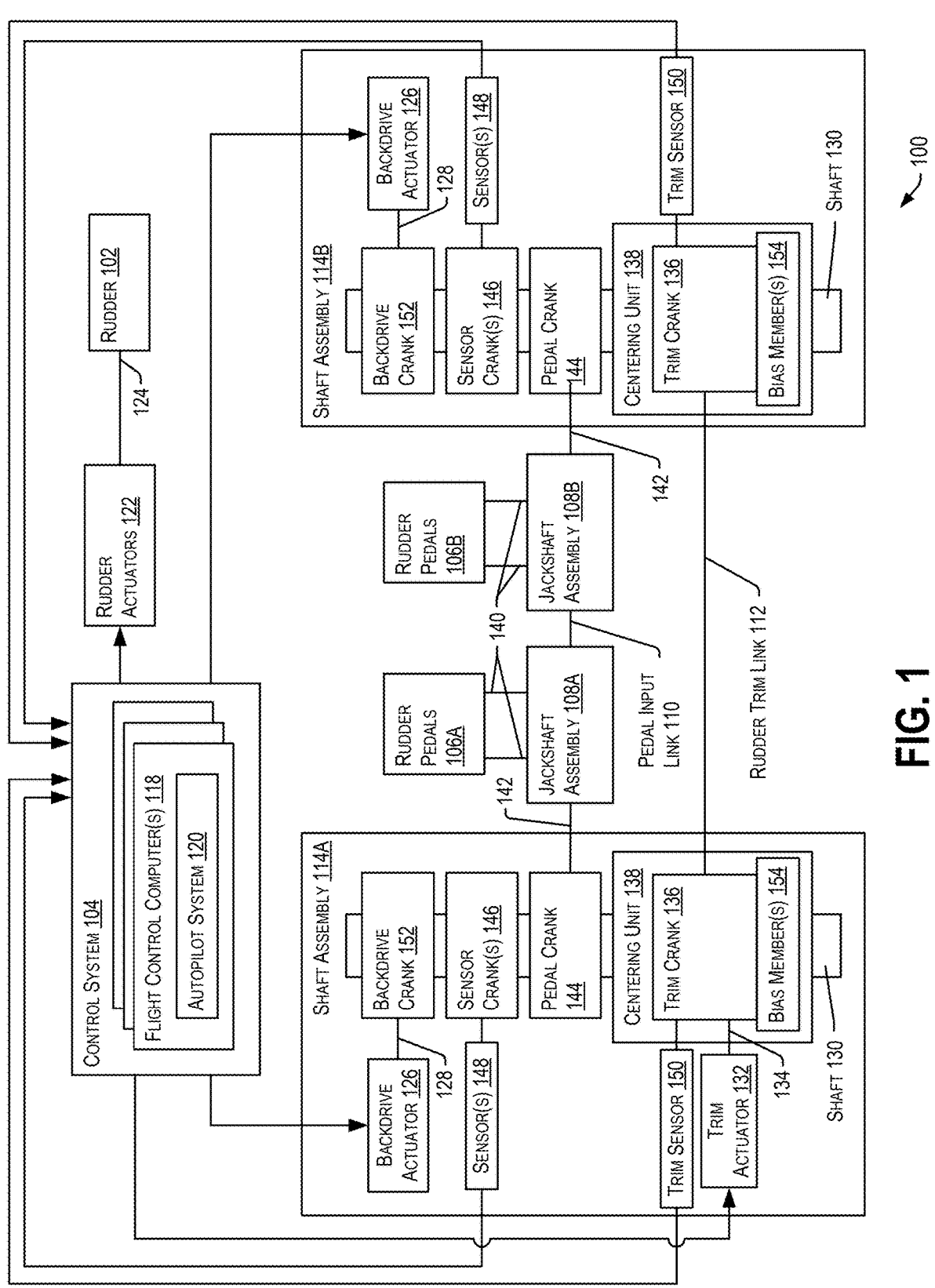
FIG. 1 is a block diagram of a rudder system of an aircraft.

A rudder system for an aircraft operable by a pair of pilots includes a rudder, a control system to control a position of the rudder based on pilot input or input from an autopilot system, a first shaft assembly coupled to first rudder pedals for a first pilot, a second shaft assembly coupled to second rudder pedals for a second pilot, other components (e.g., one or more brake systems configured to apply a base level of resistance to movement of pedals of the first rudder pedals and the second rudder pedals, one or more pedal dampers to inhibit oscillation and/or drift of the pedal positions), or combinations thereof. Each of the first shaft assembly and the second shaft assembly includes a shaft, a trim crank coupled to the shaft, one or more sensor cranks coupled to the shaft and to sensors (e.g., transducers) that provide position information for the shaft to the control system, and a pedal crank coupled to the shaft. In some implementations, the first shaft assembly, the second shaft assembly, or both, include a backdrive crank coupled to the shaft and a backdrive actuator coupled to each backdrive crank. A pedal input link couples the pedal crank of the first shaft assembly and the pedal crank of the second shaft assembly together.

The rudder system also includes a centering unit for each shaft assembly and a rudder trim link that couples the trim cranks of the shaft assemblies together. The centering unit for a shaft assembly includes one or more bias members (e.g., springs, elastic members, or combinations thereof) that rotate the shaft to a first trim position corresponding to a rudder trim position of the rudder when the trim crank is rotated and that provide a force that resists rotation of the shaft of the shaft assembly from the first trim position corresponding to the rudder trim position. The force applied by the centering unit increases with increased rotation of the shaft from the first trim position. The force also automatically rotates the shaft toward the first trim position due to reduction of other forces that cause rotation of the shaft (e.g., a force applied to the pedal crank caused by pilot input to one of the pedals or a force applied to a backdrive crank by a backdrive actuator activated by the autopilot system).

The shaft of each shaft assembly may include outer shafts, one or more splined inner shafts to couple the outer shafts together, one or more axles configured to couple to support structure for the rudder system, other components, or combinations thereof. As described herein, rotation of the shaft of a shaft assembly refers to rotation of the outer shafts. Rotation of the trim crank of the shaft assembly (e.g., by a trim actuator or the rudder trim link) causes rotation of the shaft of the shaft assembly via the centering unit. Rotation of the shaft due to a force applied through the pedal crank, due to a force applied through the backdrive crank, or due to a force applied by the centering unit, causes rotation of the shaft without causing rotation of the trim crank.

The first shaft assembly is interconnected to the second shaft assembly by the pedal input link and the rudder trim link. Output of the shaft assemblies corresponding to an amount of rotation of the shafts of the shaft assemblies due to first input to the shaft assemblies via the rudder pedals is provided to the control system from sensors of the shaft assemblies. Based on the output of the sensors, the control system is configured to provide first output to rudder actuators to control a position of the rudder. The control system is also configured to provide second output to actuators of the shaft assemblies (e.g., one or more backdrive actuators or the trim actuator) that changes positions of the pedals of the rudder pedals to provide indications of the rudder position to the pilots when rudder trim controls are used by the pilots to change the rudder trim position or in response to a change in rudder position or rudder trim position by an autopilot system of the aircraft.

When rudder trim position is changed to a new rudder trim position, the control system provides a trim control signal to the trim actuator coupled to the trim crank of the first shaft assembly to move the trim crank of the first shaft assembly, and the rudder trim link causes corresponding movement of the trim crank of the second shaft assembly. In some implementations, the rudder trim link is a mechanical link that includes one or more connectors coupled to the trim cranks of the shaft assemblies such that rotation of the trim crank of the first shaft assembly by the trim actuator causes corresponding rotation of the trim crank of the second shaft assembly. In other implementations, the trim link includes an electrical and mechanical link. For example, the trim actuator includes a first motor that drives a first control rod coupled to the trim crank of the first shaft assembly. The trim actuator includes electronics. The electronics generate drive signals based on the trim control signal received from the control system. The trim actuator sends the drive signals to the first motor to drive the first connecting rod and the trim crank of the first shaft assembly, and the trim actuator also sends the drive signals to a second motor configured to correspondingly drive a second connecting rod coupled to the trim crank of the second shaft assembly.

The rudder system includes the centering unit for each of the first shaft assembly and the second shaft assembly, and the rudder trim link between the first shaft assembly and the second shaft assembly. Having a centering unit for each of the first shaft assembly and the second shaft assembly increases commonality of the first shaft assembly and the second shaft assembly, which may simplify design, assembly, and maintenance of the aircraft. For example, instead of having a single centering unit with at least two springs, redundancy can be achieved through use of a single bias member on each centering unit while still providing continued function should the pedal input link disconnect or fail. Having a centering unit for each of the first shaft assembly and the second shaft assembly, and the rudder trim link between the first shaft assembly and the second shaft assembly enables reduced weight, smaller footprint, and reduced cost as compared to using a duplicate first shaft assembly and second shaft assembly with independently controlled rudder trim actuators.

The rudder system provides technical advantages for the aircraft of improved handling qualities, less chance of a significant unwanted rudder position change, and less change to pilot workload as compared to previous rudder systems in response to a problem with the pedal input link (e.g., failure or disconnect). Having the rudder system with a centering unit for each of the first shaft assembly and the second shaft assembly enables both shaft assemblies to continue to function after the problem occurs while providing an indication of the problem to the pilots due to requirement of less force from a pilot to move, or resist movement of, the pedals associated with the pilot due to less resistance being provided by a single centering unit instead of being provided, in part, by both centering units via the pedal input link. The centering unit associated with a pilot provides resistance to continued pedal movement by the pilot after the event instead of having a loss of resistance from a single rudder system centering unit for one of the pilots, which may mitigate a likelihood of a significant and unwanted rudder position change due to occurrence of the problem. Having both shaft assemblies continue to function allows the workload of each of the pilots to remain unchanged. The centering units continue to automatically return the rudder toward the rudder trim position and return the pedals of each set of rudder pedals to the pedal positions corresponding to the rudder trim position. In the event of the problem with the pedal input link, having the rudder system with the rudder trim link provides both pilots with indication of the rudder trim based on the positions of the pedals associated with each pilot when the pilots are not applying force to the pedals.

The figures and the following description illustrate specific exemplary implementations. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific implementations or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple sets of rudder pedals 106 are illustrated and associated with reference numbers 106A and 106B. When referring to a particular set of these rudder pedals, such as the rudder pedals 106A, the distinguishing letter "A" is used. However, when referring to any arbitrary set of these rudder pedals or to the sets of rudder pedals as a group, the reference number 106 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. For ease of reference herein, such features are generally introduced as "one or more" features and may subsequently be referred to in the singular or optional plural (as typically indicated by "(s)") unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 is a block diagram illustrating a rudder system 100 for an aircraft. The rudder system 100 includes a rudder 102, a control system 104, rudder pedals 106, jackshaft assemblies 108, a pedal input link 110, a rudder trim link 112, shaft assemblies 114, other components, or combinations thereof.

The rudder 102 is a control surface at a rear of a vertical stabilizer of the aircraft that is utilized to control yaw of the aircraft. The rudder 102 may be moved rightward (e.g., nose right) or leftward (e.g., nose left) by the control system 104 to control yaw. When the control system 104 sets the rudder 102 at a zero-degree of rudder trim position, the rudder 102 is aligned with the longitudinal axis of the aircraft. When the control system 104 changes the rudder position nose left by a particular number of degrees, the rudder 102 is rotated the particular number of degrees nose left. When the control system 104 changes the rudder position nose right by a particular number of degrees, the rudder 102 is rotated the particular number of degrees nose right The control system 104 controls operation of the aircraft. The control system 104 includes one or more flight control computers 118 (e.g., a primary flight control computer 118 and one or more redundant flight control computers 118), subsystem computers, controllers, etc. The control system 104 is configured to control rotation of the rudder 102 to implement pilot requested rudder changes during pilot-controlled operation of the aircraft and to implement autopilot requested rudder changes when an autopilot system 120 is engaged. The flight control computer(s) include instructions that implement the autopilot system 120

In some implementations, the control system 104 generates rudder command signals provided to rudder actuators 122. Based on the rudder command signals, the rudder actuators 122 extend or retract rudder control rods 124 that rotate the rudder 102 to change the position of the rudder 102. When pilot-controlled operation of the aircraft is implemented, the control system 104 receives first signals from the shaft assemblies 114. The first signals correspond to pilot input for rudder position change responsive to the pilot input to pedals of the rudder pedals 106 by one of the pilots. The control system 104 generates the rudder command signals based on the first signals and provides the rudder command signals to the rudder actuators 122 to change the position of the rudder 102.

When the autopilot system 120 of the aircraft is engaged, the autopilot system 120 may determine to change the rudder position based on sensor data received by the control system 104 from sensors of the aircraft, other input, or both. In some implementations, the autopilot system 120 generates a rudder command signal corresponding to a new rudder position and provides the rudder command signal to the rudder actuators 122 to change the position of the rudder 102. In implementations where one or both of the shaft assemblies 114 include a backdrive actuator 126, the control system 104 generates a backdrive command signal and sends the backdrive command signal to one or both of the backdrive actuator(s) 126 coupled by control rods 128 to the shaft assemblies 114. In response to one of the backdrive actuators 126 receiving the backdrive command signal, the backdrive actuator 126 engages a clutch of the backdrive actuator 126 to allow the backdrive actuator 126 to move a corresponding control rod 128 coupled to the corresponding shaft assembly 114 to rotate shafts 130 of the shaft assemblies 114. The shaft assemblies 114 send the first signals corresponding to positions of the shafts 130 to the control system 104, which causes the control system to generate and send rudder command signals to the rudder actuators to change the rudder position to a position corresponding to the position of the shafts 130 and causes the shaft assemblies 114 to change the position of pedals of the rudder pedals 106 to positions that correspond to the rudder position. After implementation of the backdrive command signal by the backdrive actuator 126, the clutch of the backdrive actuator 126 is disengaged to prevent the backdrive actuator 126 from inhibiting rotation of the shafts 130 of the shaft assemblies 114 due to pilot input via pedals of the rudder pedals 106 and due to implementation of a rudder trim change. In other implementations, the control system 104 may implement rudder position changes from the autopilot system in a different manner.

The control system 104 is configured to implement a change of rudder trim position of the rudder 102 from a previous rudder trim position to a new rudder trim position based on input received from one of the pilots via one or more controls of the aircraft (e.g., instrument panel controls) or based on input received from the autopilot system 120. To implement input from one of the pilots or the autopilot system 120 that specifies the new rudder trim position, the control system 104 generates a rudder trim command signal that will rotate the shafts 130 to particular positions needed to produce the new rudder trim position and provides the rudder trim command signal to a trim actuator 132 coupled to one of the shaft assemblies 114.

In the implementation of FIG. 1, the trim actuator 132 is part of the shaft assembly 114A. The trim actuator 132 is coupled by a control rod 134 to a trim crank 136 of shaft assembly 114A. When the trim actuator 132 rotates the trim crank 136 by moving the control rod 134, the rudder trim link 112 causes corresponding rotation of the trim crank 136 of the shaft assembly 114B. In other implementations, the trim actuator 132 is part of the shaft assembly 114B and rotation of the trim crank 136 of the shaft assembly 114B by the trim actuator 132 causes corresponding rotation of the trim crank 136 of the shaft assembly 114A via the rudder trim link 112.

In some implementations, the rudder trim link 112 is a mechanical link between the trim crank 136 of the first shaft assembly 114A and the trim crank 136 of the second shaft assembly 114B. The mechanical link may include one or more rods, one or more cables of a cable system (e.g., one or more cables, one or more pulleys coupled to the cable(s) to change direction of applied force, or both), other components, or combinations thereof. When the mechanical link includes a cable of a cable system coupled to the trim cranks 136 of the shaft assemblies 114, a rotation system (e.g., a spring system, a second cable of the cable system, other system, or combination thereof) coupled to the trim crank of the second shaft assembly 114B maintains the cable in tension whether the trim actuator 132 rotates the trim crank 136 of the first shaft assembly 114A clockwise or counterclockwise.

In other implementations, the rudder trim link 112 is an electrical and mechanical link. The trim actuator 132 of the first shaft assembly 114A includes electronics and a first drive (e.g., first drive 302 of FIG. 3) coupled to the control rod 134. The rudder trim link 112 includes a second drive (e.g., second drive 502 of FIG. 5) and a second control rod (e.g., second control rod 504 of FIG. 5) of the second shaft assembly 114B, and wiring (e.g., wiring 308 of FIG. 3) that electrically connects the second drive 502 to the electronics of the trim actuator 132 (e.g., the second drive 502 is slaved to the trim actuator 132). The electronics receive the rudder trim command signal from the control system 104 and provide a first signal to the first drive 302 that causes the first drive 302 to adjust a position of the control rod 134 to rotate the trim crank 136 of the first shaft assembly 114A to a first position corresponding to new rudder trim position. The electronics also generates and sends, via the wiring 308, a second signal to the second drive 502 that causes the second drive 502 to adjust a position the second control rod 504 to rotate the trim crank 136 of the second shaft assembly 114B to a position that corresponds to the first position of the trim crank 136 of the first shaft assembly 114A. The first signal and the second signal may be the same.

In some implementations, each of the first drive 302 and the second drive 502 are low gear ratio motors that drive the control rod 134 and the second control rod 504 based on the same signal from the electronics of the trim actuator 132. The use of low gear ratio motors to drive the control rod 134 and the second control rod 504 based on the same rudder trim command signal from the control system 104 allows substantially the same extension or retraction of the control rod 134 and the second control rod 504 (e.g., within plus or minus 0.02 inches or some other tolerance) to cause the same rotation, or substantially the same rotation, of the trim cranks 136 of the shaft assemblies 114 (e.g., within acceptable limits of plus or minus a tenth of a degree or some other tolerance).

The rudder trim command signal sent by the control system 104 to the trim actuator 132 of the first shaft assembly 114A causes corresponding rotation of the trim cranks 136 of the shaft assemblies 114. Rotation of the trim cranks 136 causes the shafts 130 of the shaft assemblies 114 to rotate to first positions corresponding to the new rudder trim position via centering units 138 of the shaft assemblies 114. Rotation of the shafts 130 to the first positions causes pedals of the rudder pedals 106 to change positions. When the aircraft is being controlled by pilot input, the change in position of the shafts 130 results in a change in force needed by a pilot pushing one of the pedals to maintain a position of the pedal. In response to detection of the change in force, the pilot may stop applying force to the pedal so that the shaft assemblies 114 position the pedals to particular positions corresponding to the new rudder trim position.

The shaft assemblies 114 send signals to the control system 104 corresponding to rotational positions of the shafts 130 of the shaft assemblies 114 as the shafts 130 are rotated to the first positions due to activation of the trim actuator 132. The control system 104 processes the signals to generate rudder command signals for the rudder actuators 122 that cause the rudder actuators 122 to adjust positions of the rudder control rods 124 to change the position of the rudder 102. The position of the rudder 102, when no additional pilot input to one of the pedals of the rudder pedals 106 is provided, corresponds to the new rudder trim position. In other implementations, the control system 104 may implement rudder trim position changes in a different manner.

Each of the rudder pedals 106 includes a right pedal and a left pedal configured to rotate about a rudder pedal pivot axis. When the autopilot system is engaged, pilot input to one of the pedals is configured to disengage the autopilot system 120. The right pedal and the left pedal are coupled by control rods 140 to the jackshaft assemblies 108. The jackshaft assemblies 108 interconnect the right pedal and the left pedal of each of the rudder pedals 106 via the control rods 140 so that pilot input that pushes the right pedal in a first direction away from the pilot causes the left pedal to move in an opposite direction to the first direction, and vice versa. A first portion of each jackshaft assembly 108 is coupled to a corresponding shaft assembly 114 by a control rod 142.

Also, the first portions of the jackshaft assemblies 108 are coupled together by the pedal input link 110. Pilot input to one of the pedals of the rudder pedals 106A that moves the pedal causes the first portion of the jackshaft assembly 108A to rotate and the pedal input link 110 causes the first portion of the jackshaft assembly 108B to correspondingly rotate. Similarly, pilot input to one of the pedals of the rudder pedals 106B that moves the pedal causes the first portion of the jackshaft assembly 108B to rotate and the pedal input link 110 causes the first portion of the jackshaft assembly 108A to correspondingly rotate. Rotation of the first portions of the jackshaft assemblies 108 due to pilot input that causes pedal movement causes control rods 142 to rotate the shafts 130 of the shaft assemblies 114.

Figure 2:
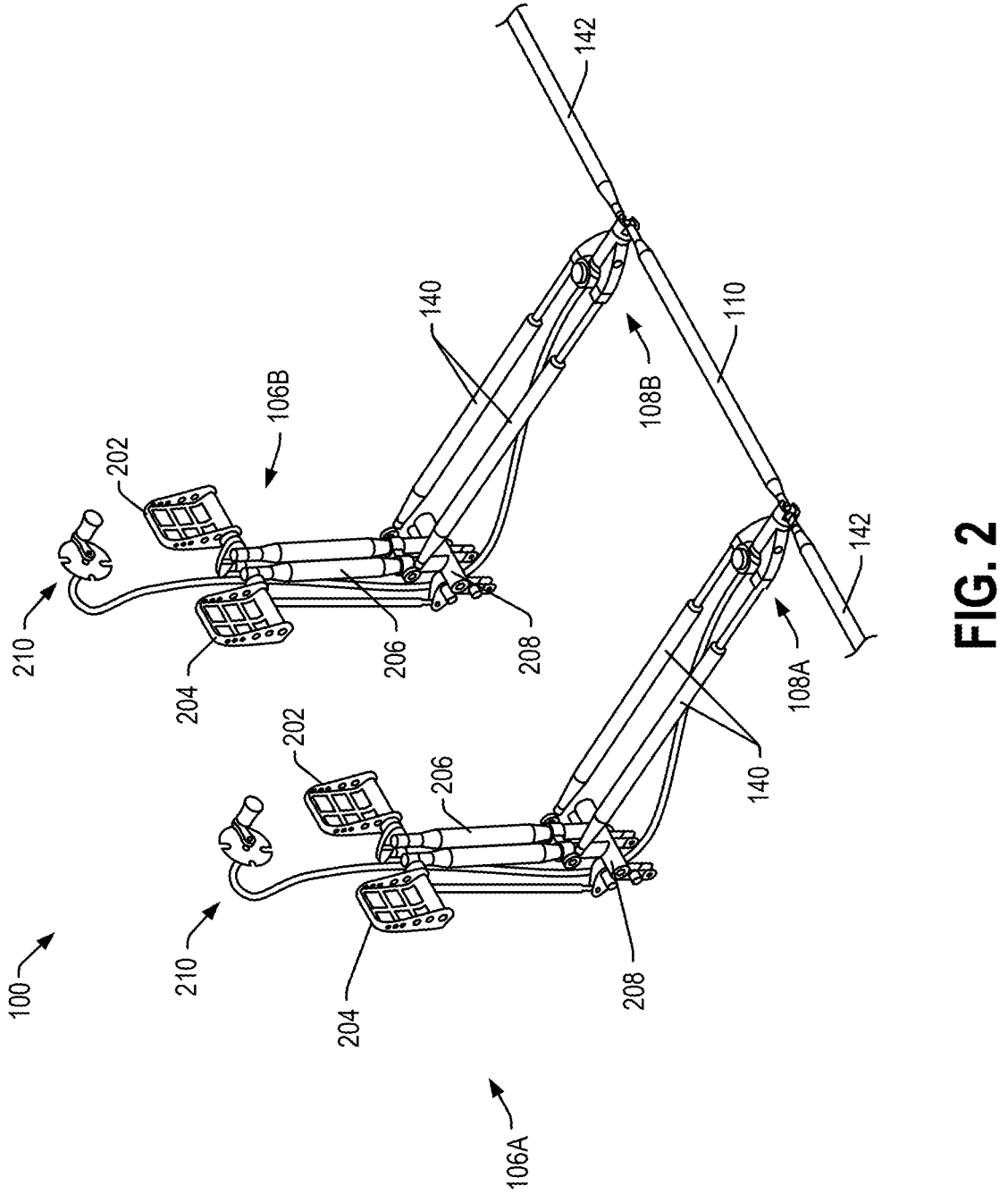
FIG. 2 is a perspective representation of the rudder pedals and jackshaft assemblies of the rudder system 100 of FIG. 1.

FIG. 2 depicts a perspective representation of the rudder pedals 106 and jackshaft assemblies 108 of the rudder system 100 of FIG. 1. The rudder pedals 106A, 106B each include a right pedal 202, a left pedal 204, and pedal arms 206. The pedals 202, 204 are connected by the pedal arms 206 to a pedal pivot 208 configured to allow the pedals 202, 204 to rotate about a rudder pedal pivot axis. A first set of control rods 140 connect each of the pedal arms 206 of the rudder pedals 106A to the jackshaft assembly 108A, and a second set of control rods 140 connect each of the pedal arms 206 of the rudder pedals 106B to the jackshaft assembly 108B. The control rods 142 and the pedal input link 110 are also connected to the jackshaft assemblies 108.

Movement of a particular pedal 202, 204 by a pilot causes movement of the other pedals, movement of the pedal input link 110, and movement of the control rods 142. For example, when the pedal 202 of the rudder pedals 106A is depressed by a pilot, the corresponding pedal arm 206 and pedal pivot 208 causes rotation of the pedal 202 about the pedal rotation axis and the corresponding control rod 140 moves with the pedal arm 206 and causes a first portion of the jackshaft assembly 108A to rotate to the right. The jackshaft assembly 108A also causes the control rod 140 corresponding to the pedal 204 of the rudder pedals 106A to move toward the jackshaft assembly 108A so that the pedal 204 moves in an opposite direction to the pedal 202 a distance corresponding to a travel distance of the pedal 202. Rotation of the first portion of the jackshaft assembly 108A to the right causes movement of the control rods 142 and movement of the pedal input link 110 to the right. Movement of the pedal input link 110 causes the first portion of the jackshaft assembly 108B to move to the right, which causes the pedals 202, 204 of the rudder pedals 106B to move to positions corresponding to the positions of the pedals 202, 204 of the rudder pedals 106A via movement of the corresponding control rods 140 coupled to the pedal arms 206 of the rudder pedals 106B.

A rudder pedal adjustment crank system 210 is coupled to each jackshaft assembly 108. The rudder pedal adjustment crank system 210 enables pilots to adjust the positions of the pedals 202, 204 of each of the rudder pedals 106 without causing rotation of the first portion of the corresponding jackshaft assembly so that the pedals 202, 204 are appropriately positioned based on individual pilot stature when no force is applied to the pedals 202, 204.

Returning to FIG. 1, each shaft assembly 114 includes the shaft 130, a pedal crank 144, one or more sensor cranks 146 (e.g., a sensor crank 146 near each end of the shaft 130), one or more sensors 148 (e.g., transducers) coupled to the sensor crank(s) 146, the trim crank 136, a trim sensor 150 (e.g., trim transducer) coupled to the trim crank 136, the centering unit 138, other components (e.g., a backdrive crank 152 and corresponding backdrive actuator 126, one or more stops coupled to the shaft 130, where each stop is configured to provide an end limit of a range of rotation for the shaft 130, one or more friction brakes to provide a base level of resistance to pedal movement, one or more pedal dampers to inhibit oscillation of the pedals, etc.), or combinations thereof. In some implementations, the rudder system 100 does not include the backdrive actuator(s) 126, control rod(s) 128, and backdrive crank(s) 152. In other implementations, one or both of the shaft assemblies 114 include a backdrive actuator 126, a control rod 128, and a backdrive crank 152. For example, each of the shaft assemblies 114 of the rudder system 100 of FIG. 1 include a backdrive actuator 126, a control rod 128, and a backdrive crank 152.

In a shaft assembly implementation, the shaft 130 includes an outer shaft, an inner shaft coupled to the outer shaft, bearings, an axle, other components, or combinations thereof. Portions of the shaft 130 (e.g., portions of the axle) are coupled to support structure of the aircraft to enable rotation of one or more portions of the shaft 130 (e.g., the outer shaft) relative to the support structure. Other implementations of the shafts 130 may also be utilized.

The pedal cranks 144, the backdrive cranks 152, the sensor cranks 146, and the trim cranks 136 are coupled to the shafts 130. Rotation of one of the pedal cranks 144 by the corresponding control rod 142 due to a pilot pressing one of the pedals of the rudder pedals 106 causes rotation of the shafts 130 and a corresponding change of the position of the rudder 102 by the control system 104. Rotation of one of the backdrive cranks 152 by one of the backdrive actuators 126 due to a change of rudder position implemented by the autopilot system 120 causes rotation of the shafts 130 and corresponding changes to positions of the rudder pedals 106. Rotation of the trim cranks 136 by the trim actuator 132 and the rudder trim link 112 to trim positions causes rotation of the shafts 130 via the centering units 138, a corresponding change of the position of the rudder 102 by the control system 104, and corresponding changes to positions of the rudder pedals 106.

Rotation of the shafts 130 caused by force applied to the pedal cranks 144 responsive to pilot input via one of the pedals of the rudder pedals 106, force applied to one of the backdrive cranks 152 by one of the backdrive actuators 126 of the control system 104 due to an autopilot-implemented rudder position change, or force applied to the shafts 130 by the centering units 138 due to a change to the rudder trim position of the rudder 102 implemented by the control system 104, causes rotation of the sensor cranks 146. The sensors 148 coupled to the sensor cranks 146 generate first signals corresponding to the rotational positions of the shafts 130 and provide the first signals to the control system 104.

The trim cranks 136 enable the rudder system 100 to implement a change to the trim position of the rudder 102. The trim sensors 150 coupled to the trim cranks 136 provide trim signals to the control system 104 that enable the control system 104 to determine whether a current rudder trim position is correct. If a determination is that the current trim position is not correct, an error code may be generated, a warning may be presented to the pilots by the control system 104, a correction may be implemented by the control system 104 to adjust the current rudder trim position to the correct rudder trim position, or combinations thereof. The trim sensors 150 also enable components of the control system 104 to determine that the rudder trim link 112 is not operational when a difference between the signals provided by the trim sensor 150 of the first shaft assembly 114A and the trim sensor 150 of the second shaft assembly 114B is outside of a threshold range. When the control system 104 identifies that the rudder trim link 112 is not operational, the control system 104 may identify a particular trim sensor 150 that is providing problematic trim signals based on an analysis of previous trim signals, isolate the particular shaft assembly 114 associated with the particular trim sensor 150 from controlling the rudder 102 via output from the sensors(s) 148 associated with the particular shaft assembly 114, provide an alert to the pilots, perform other actions, or combinations thereof.

Each trim crank 136 is coupled to the corresponding shaft 130 by bearings that enable the shaft 130 to rotate freely relative to the trim crank 136 so that rotation of the shaft 130 caused by rotation of the pedal crank 144, or caused by rotation of the backdrive crank 152, does not cause rotation of the trim crank 136. When the trim cranks 136 are rotated by the trim actuator 132 and the rudder trim link 112 to trim positions, the centering units 138 of the shaft assemblies 114 cause rotation of the shafts 130, which causes rotation of the pedal cranks 144 and corresponding movement of the pedals of the rudder pedals 106, rotation of the backdrive cranks 152, and rotation of the sensor cranks 146. First signals sent by the sensors 148 coupled to the sensor cranks 146 cause the control system 104 to implement corresponding rudder movement based on the positions of the shafts 130.

Each centering unit 138 is configured to generate a first force applied to the corresponding shaft 130 that resists rotation of the shafts 130 of the shaft assemblies 114 due to a second force applied to the shafts 130 that causes rotation of the shafts 130 away from a first position that corresponds to the rudder trim position of the rudder 102. The first force increases as the amount of rotation from the first position increases. The first force causes the shafts 130 to rotate toward the first position responsive to reduction of the second force.

The second force that causes rotation of the shafts 130 is generated responsive to pilot input to the shaft assemblies 114 via the rudder pedals 106, and autopilot system input to the shaft assemblies 114 via one or both of the backdrive actuators 126. When a pilot is not pressing a pedal of the rudder pedals 106 with enough force to cause movement of one of the pedals of the rudder pedals 106, positions of the pedals indicate to the pilot an amount of deviation from the zero-degree of rudder trim position (e.g., the right pedal and the left pedal of the rudder pedals 106 are even with each other when the rudder trim position is at the zero-degree of rudder trim position, and the right pedal is depressed more than the left pedal when the rudder trim position is a non-zero amount of nose right trim). The resistance caused by the first force provides a sense of feel that informs the pilot that the pilot is causing a change to the position of the rudder 102 from the rudder trim position of the rudder 102.

Figure 3:
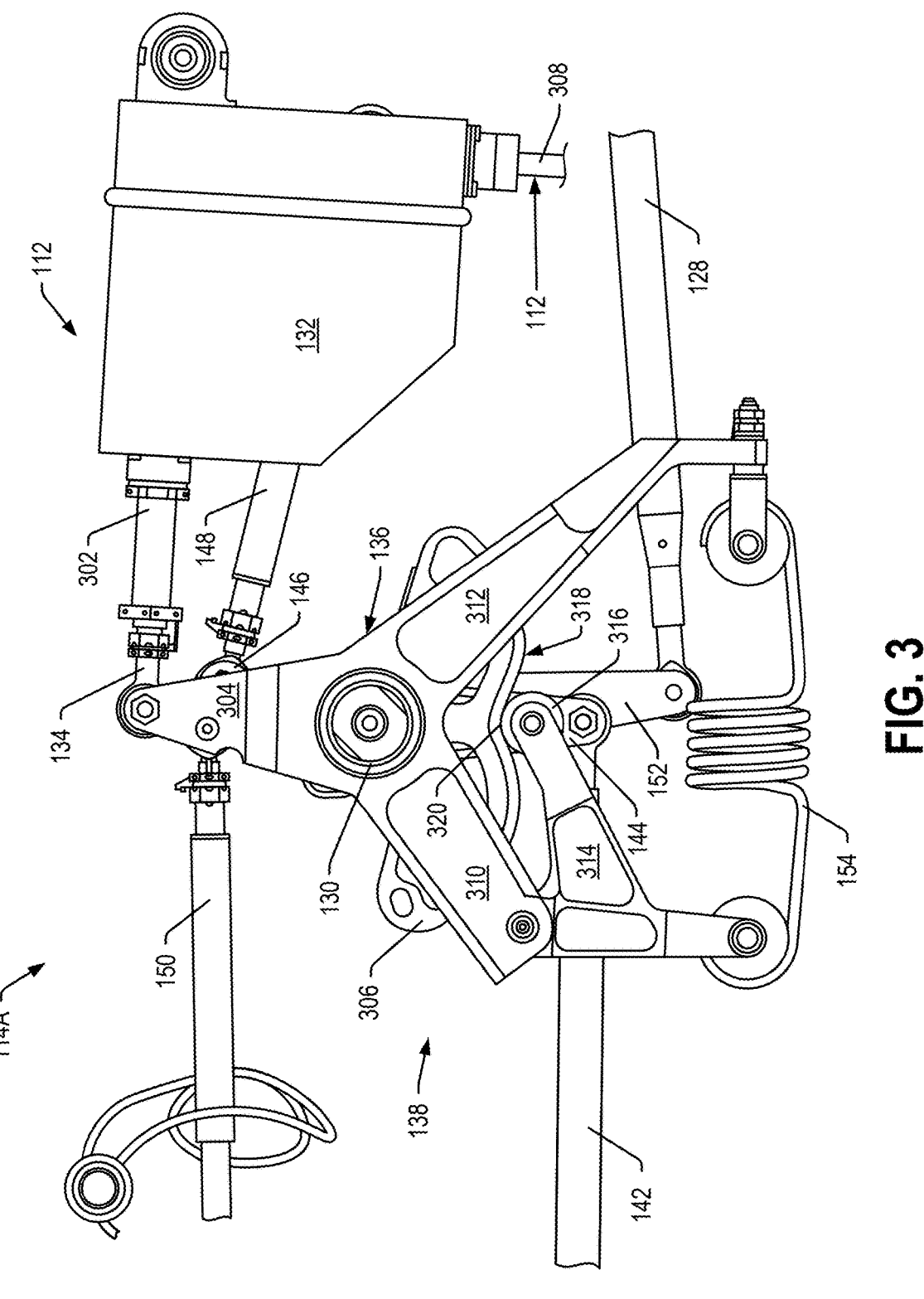
FIG. 3 is a side view representation of a first implementation of a portion of one of the shaft assemblies of the rudder system 100 of FIG. 1 with no force applied to the shaft of the shaft assembly due to pilot input or due to autopilot input.
Figure 4:
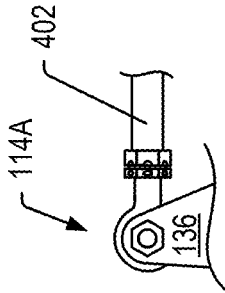
FIG. 4 is a side view representation of a second implementation of a portion of one of the shaft assemblies of the rudder system 100 of FIG. 1 with no force applied to the shaft of the shaft assembly due to pilot input or due to autopilot input.
Figure 5:
FIG. 5 is a side view representation of a third implementation of a portion of the other shaft assembly of the rudder system 100 of FIG. 3 with force applied to the shaft of the shaft assembly due to pilot input or due to autopilot input.

Each centering unit 138 includes the trim crank 136, one or more bias members 154 (e.g., springs, elastic members, etc.) that couple the trim crank 136 to the shaft 130, other components, or combinations thereof. The bias member(s) 154 apply the first force to the corresponding shaft 130 that resists rotation of the shafts 130 and that rotates the shafts 130 toward the position corresponding to the rudder trim position of the rudder 102 due to reduction of the second force that rotates the shafts 130. FIGS. 3-5 depict particular implementations of centering units 138. Other types of centering units 138 with different arrangements of the bias members 154, different number of bias members 154, different trim cranks 136, or combinations thereof, may also be used.

The rudder system 100 advantageously allows pilots to know, by detection of a change in resistance to pilot input via the rudder pedals 106, if a problem occurs with the pedal input link 110 (e.g., failure or disconnect) during a flight. Should the problem occur, the rudder system 100 allows continued operation of the rudder system 100 by either pilot due to each shaft assembly 114 including the centering unit 138. Should a problem occur with the rudder trim link 112 during flight, the control system 104 of the rudder system 100 is advantageously able to identify the problem based on trim signals from the trim sensors 150 of the shaft assemblies 114 and the control system 104 is able to isolate a shaft assembly 114 associated with the trim sensor 150 providing problematic trim signals to prevent signals from the sensor(s) 148 associated with the shaft assembly 114 from controlling the position of the rudder 102.

FIG. 3 depicts a side view representation of a first implementation of a portion of the shaft assembly 114A of the rudder system 100 of FIG. 1 with no second force applied to the shaft 130 due to pilot input or due to autopilot input that rotates the shaft 130 from a first position corresponding to the rudder trim position of the rudder 102. The first position depicted in FIG. 3 may correspond to the zero-degree of rudder trim position. The portion of the shaft assembly 114A depicted in FIG. 3 includes a portion of the control rod 128 coupled to the backdrive crank 152 and coupled to one of the backdrive actuator(s) 126 (not shown), the shaft 130, the trim actuator 132 coupled by the control rod 134 to a first arm 304 of the trim crank 136, a portion of the rudder trim link 112, a portion of the control rod 142 coupled to the pedal crank 144, a portion of the pedal crank 144, a portion of the backdrive crank 152, a portion of one of the sensors 148 coupled to a sensor crank 146, the trim crank 136 rotatably coupled to the shaft 130, a portion of the trim sensor 150 coupled to the trim crank 136, and the centering unit 138. The trim actuator 132 includes the first drive 302. In some implementations, the first drive 302 includes a low gear ratio motor.

The centering unit 138 includes the trim crank 136, a coil spring as the bias member 154, and a cam 306 coupled to the shaft 130 such that rotation of the shaft 130 causes rotation of the cam 306 and vice versa. In FIG. 3, a mechanical link is not connected to the first arm 304 the trim crank 136 of the first shaft assembly 114A and the trim crank 136 of the other shaft assembly 114B (not shown), so the rudder trim link 112 of the rudder system 100 depicted in FIG. 3 includes wiring 308 that is electrically coupled to a second drive 502 (depicted in FIG. 5). As shown in FIG. 5, the second drive 502 is coupled to the trim crank 136 of the shaft assembly 114B by a second control rod 504. The rudder trim link 112 of FIG. 3 and FIG. 5 is an electrical and mechanical link.

In other implementations, the rudder trim link 112 is a mechanical link between the trim cranks 136. For example, FIG. 4 depicts a side view representation of a second implementation of a portion of the shaft assemblies 114 of the rudder system 100 of FIG. 1 with no second force applied to the shaft 130 due to pilot input or due to autopilot input that rotates the shaft 130 from a first position corresponding to the trim position of the rudder 102. The first position depicted in FIG. 4 is different than the first position depicted in FIG. 3 because the trim crank 136 of the shaft assembly 114A of FIG. 4 is in a different rotational orientation than the trim crank 136 of FIG. 3 (i.e., the rudder trim positions associated with FIG. 3 and FIG. 4 are different).

In the second implementation of FIG. 4, the rudder trim link 112 is a mechanical link 402 (e.g., a rod) that couples the trim crank 136 of the first shaft assembly 114A to the trim crank 136 of the second shaft assembly 114B. When the trim actuator 132 (not shown) coupled to the first shaft assembly 114A is activated to rotate the trim crank 136 of the first shaft assembly 114A clockwise by a first number of degrees, the mechanical link 402 causes the trim crank 136 of the second shaft assembly 114B to rotate clockwise by the first number of degrees. Rotation of the trim cranks 136 causes corresponding rotations of the shafts 130 of the shaft assemblies 114 via the centering units 138. In other implementations, the mechanical link 402 may be implemented in a different manner. For example, the mechanical link 402 may be a cable system and a rotational system is connected to the trim crank 136 of the second shaft assembly 114B to maintain a cable of the cable system in tension so that rotation of the trim crank 136 by the trim actuator 132 (not shown) of the first shaft assembly 114A causes corresponding rotation of the trim crank 136 of the second shaft assembly 114B.

Returning to FIG. 3, the trim crank 136 includes a second arm 310 and a third arm 312. A follower assembly 314 is rotationally coupled to the second arm 310. The bias member 154 is coupled to the follower assembly 314 and the third arm 312. A follower 316 (e.g., a roller) of the follower assembly 314 is coupled to an edge of the cam 306 that defines a travel path 318 for the follower 316. The travel path 318 includes a detent 320 located in a middle portion of the travel path 318.

When a second force is applied to the shaft 130 via the pedal crank 144 or the backdrive crank 152 that causes rotation of the shaft 130 and the cam 306 coupled to the shaft 130, the follower 316 moves away from the detent 320 along the travel path 318 and causes rotation of the follower assembly 314. The shape of the travel path 318 causes the bias member 154 to generate the first force that resists the second force due to elongation of the bias member 154 caused by rotation of the follower assembly 314 away from the third arm 312 due to the follower 316 following the travel path 318 away from the detent 320. When the second force is reduced, the first force applied by the bias member 154 causes the bias member 154 to shorten and rotate the follower assembly 314 so that the follower 316 moves along the travel path 318 toward the detent 320.

FIG. 5 depicts a side view representation of a third implementation of a portion of the shaft assembly 114B of the rudder system 100 of FIG. 3 with a second force applied to the shaft 130 due to pilot input or due to autopilot input that rotated the shaft 130 away from the first position corresponding to the rudder trim position of the rudder 102. For example, due to pilot input to one of the pedals of the rudder pedals 106 of FIG. 1, the control rod 142 applied the second force to the pedal crank 144 which caused rotation of the shaft 130 and corresponding rotation of the backdrive crank 152, the sensor crank(s) 146, and the cam 306. The sensor(s) 148 coupled to the sensor cranks (s) 146 send signals corresponding to rotational position of the shaft 130 to the control system 104 of FIG. 1. When an initial position of the shaft 130 is the first position corresponding to the rudder trim position of the rudder 102, the follower 316 is positioned at the detent 320. Application of the second force to the pedal crank 144 by the control rod 142 causes rotation of the cam 306, and the follower 316 follows the travel path 318 away from the detent 320. Movement of the follower 316 away from the detent 320 causes the bias member 154 to generate the first force due to elongation of the bias member 154 caused by rotation of the follower assembly 314. The second force is resisted by the first force and the resistance provided by a base resistance needed to move the pedal. A portion of the first force due to the bias member 154 of the shaft assembly 114B, and a portion of the first force due to the bias member 154 of the shaft assembly 114A (shown in FIG. 3) is felt by the pilot and provides the pilot with knowledge that input has been provided to cause a change to rudder position by the rudder system 100.

If the second force is reduced, the bias member 154 will cause rotation of the follower assembly 314 toward the third arm 312 as the bias member 154 shortens and the first force reduces. The rotation of the follower assembly 314 causes the follower 316 to move along the travel path 318 toward the detent 320, which causes rotation of the shaft 130 toward the first position corresponding to the rudder trim position of the rudder. If the second force is removed, the bias member 154 will cause the follower 316 to be positioned in the detent 320 and the movement of the follower 316 along the travel path 318 to the detent 320 will cause rotation of the shaft to the first position.

In some implementations, the shape of the travel path 318 of the cam 306 of the shaft assembly 114B is the same as the shape of the travel path 318 of the cam 306 of the shaft assembly 114A. In other implementations, the shape of the travel path 318 of the cam 306 of the shaft assembly 114B is different than the shape of the travel path 318 of the cam

306 of the shaft assembly 114A. Having travel paths with different shapes can inhibit the pilots from sensing two different first positions corresponding to when the followers 316 are positioned in corresponding detents 320 of the travel paths 318 during movement of the pedals of the rudder pedals 106 if the rotational positions of the shafts 130 of the shaft assemblies 114A, 114B are out of alignment relative to each other.

FIG. 6 is a flowchart of an example of a method 600 for rudder control of an aircraft. The method 600 may be performed by the rudder systems 100 of any of FIGS. 1-5. The operations described with reference to FIG. 6 may be performed by the control system 104 (e.g., the flight control computer(s) 118) of FIG. 1. The method 600 includes, at block 602, receiving input to change a rudder trim of the aircraft to a particular rudder trim position. For example, the control system 104 may receive input from a pilot using one or more controls of an instrument panel to change the rudder trim position of the rudder 102 of the aircraft. As another example, the control system 104 may receive input from the autopilot system 120 to change the rudder trim position of the rudder 102. The input may be based on an analysis of sensor data and other inputs. The particular rudder trim position may be the zero-degree of rudder trim position, a particular number of degrees of nose right rudder trim position, or a particular number of degrees of nose left rudder trim position.

The method 600, at block 604, also includes sending a rudder trim command signal based on the input to a trim actuator of a first shaft assembly. The rudder trim signal causes the trim actuator to rotate a trim crank of the first shaft assembly. A rudder trim link causes corresponding rotation of a trim crank of a second shaft assembly. Each of the first shaft assembly and the second shaft assembly includes a shaft, the trim crank coupled to the shaft, a pedal crank coupled to the shaft, and a pedal input link configured to couple the pedal crank of the first shaft assembly and the pedal crank of the second shaft assembly together. Rotation of the trim crank causes rotation of the shaft. Rotation of the pedal crank causes rotation of the shaft without rotation of the trim crank.

For example, the control system 104 determines particular trim positions for the trim cranks 136 of the shaft assemblies 114A, 114B, and generates a rudder trim command signal that will cause rotation of the trim crank 136 of the shaft assembly 114A to a trim position corresponding to the particular rudder trim position of the rudder 102. The control system 104 sends the rudder trim command signal to the trim actuator 132 of the first shaft assembly 114A. Receipt of the rudder trim command signal causes the rudder trim actuator to rotate the trim crank 136 of the first shaft assembly 114A to the trim position and causes corresponding rotation of the trim crank 136 of the second shaft assembly 114B via the rudder trim link 112. In some implementations, the rudder trim link 112 is a mechanical link (e.g., the mechanical link 402 of FIG. 4). In other implementations, the rudder trim link 112 is an electrical and mechanical link (e.g., the rudder trim link 112 includes wiring 308 that electrically connects the trim actuator 132 to the second drive 502, and a second control rod 504 that couples the second drive to the trim crank 136 of the second shaft assembly 114B.

The method 600 includes receiving signals at the control system 104 corresponding to the positions of the shafts 130 of the shaft assemblies 114A, 114B from the sensors 148 of the shaft assemblies 114A, 114B. In response to the signals, the control system 104 determines generates rudder command signals and provides the rudder command signals to the rudder actuators 122. The rudder command signals cause the rudder actuators 122 to extend or retract the rudder control rods 124 that rotate the rudder 102 to change the position of the rudder 102.

The method 600 also includes receiving a first signal from the autopilot system 120 of the aircraft to change the rudder position. In response to the first signal, the control system 104 generates the rudder command signals and provides the rudder command signals to the rudder actuators 122.

FIG. 7 is a flowchart illustrating an example 700 of a life cycle of an aircraft that includes the rudder system 100 of FIG. 1. During pre-production, the exemplary method 700 includes, at block 702, specification and design of the aircraft. During specification and design of the aircraft, the method 700 may include specification and design of the rudder system 100. At block 704, the method 700 includes material procurement, which may include procuring materials for the rudder system 100.

During production, the method 700 includes, at block 706, component and subassembly manufacturing and, at block 708, system integration of the aircraft. For example, the method 700 may include component and subassembly manufacturing of the rudder system 100 and system integration of the rudder system 100. At block 710, the method 700 includes certification and delivery of the aircraft and, at block 712, placing the aircraft in service. Certification and delivery may include certification of the rudder system 100 to place the rudder system 100 in service. While in service by a customer, the aircraft may be scheduled for routine maintenance and service (which may also include modification, reconfiguration, refurbishment, and so on). At block 714, the method 700 includes performing maintenance and service on the aircraft, which may include performing maintenance and service on the rudder system 100.

Each of the processes of the method 700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Figure 8:
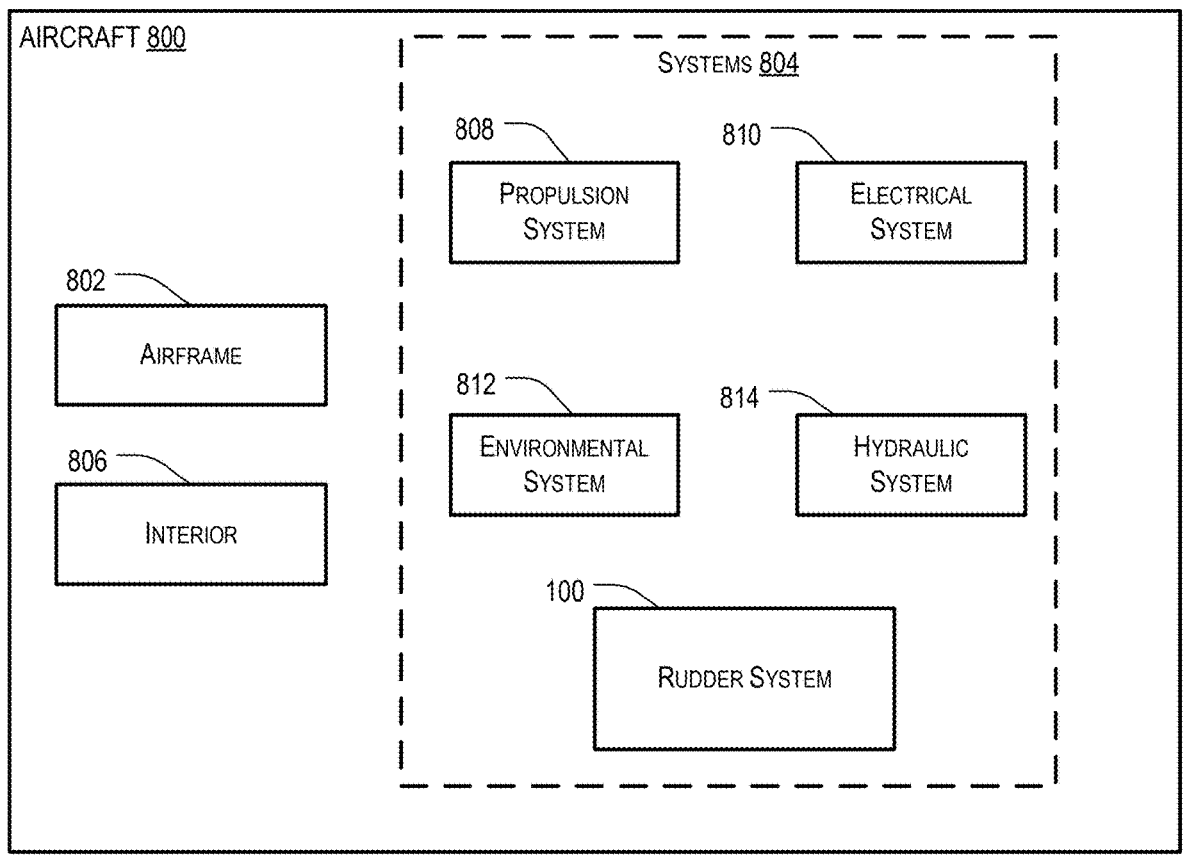
FIG. 8 is a block diagram illustrating aspects of an illustrative aircraft that includes a rudder system of FIG. 1.

Aspects of the disclosure can be described in the context of an example of an aircraft 800 as shown in FIG. 8. In the example of FIG. 8, the aircraft 800 includes an airframe 802 with a plurality of systems 804 and an interior 806. Examples of the plurality of systems 804 include one or more of a propulsion system 808, an electrical system 810, an environmental system 812, a hydraulic system 814, and the rudder system 100. Any number of other systems may be included. In the example of FIG. 8, the aircraft 800 includes the rudder system 100 in accordance with one or more aspects of the disclosure as described in FIGS. 1-6. Portions of the rudder system 100 are included in the airframe 802 and the interior 806. Also, the rudder system 100 utilizes portions of the electrical system 810 and the hydraulic system 814. For example, the rudder actuators 122 may be powered by the hydraulic system 814, and the trim actuator 132 may be powered by the electrical system 810.

Figure 9:
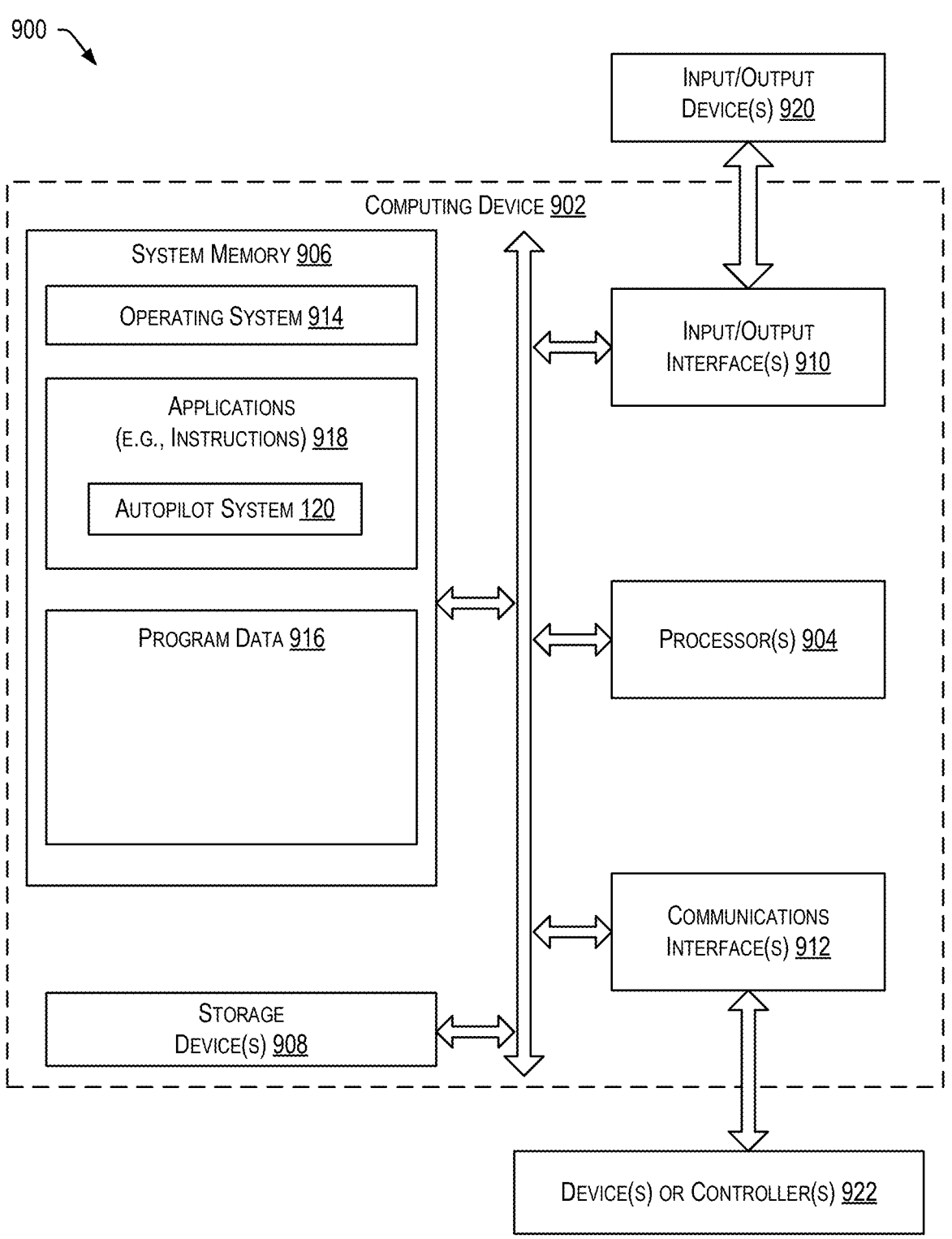
FIG. 9 is a block diagram of a computing environment including a computing device configured to support aspects of computer-implemented methods and computer-executable program instructions (or code) according to the present disclosure.

FIG. 9 is a block diagram of a computing environment 900 including a computing device 902 configured to support aspects of computer-implemented methods and computer-executable program instructions (or code) according to the present disclosure. For example, the computing device 902, or portions thereof, is configured to execute instructions to initiate, perform, or control one or more operations described with reference to FIGS. 1-6. Each of the control system 104 and the flight control computer(s) 118 of FIG. 1 may include one or more of the computing devices 902.

The computing device 902 includes one or more processors 904. The processor(s) 904 are configured to communicate with system memory 906, one or more storage devices 908, one or more input/output interfaces 910, one or more communications interfaces 912, or any combination thereof. The system memory 906 includes volatile memory devices (e.g., random access memory (RAM) devices), nonvolatile memory devices (e.g., read-only memory (ROM) devices, programmable read-only memory, and flash memory), or both. The system memory 906 stores an operating system 914, which may include a basic input/output system for booting the computing device 902 as well as a full operating system to enable the computing device 902 to interact with users, other programs, and other devices. The system memory 906 stores program data 916, such as any data used or generated by the rudder system 100, one or more modules, one or more machine learning models, or a combination thereof, as described with reference to FIGS. 1-6. For example, the program data 916 of a computing device of the control system 104 stores rules used to determine a signal used to determine a rudder command signal based on a plurality of signals received from sensors 148 of the shaft assemblies 114.

The system memory 906 includes one or more applications 918 (e.g., sets of instructions) executable by the processor(s) 904. As an example, the one or more applications 918 include instructions executable by the processor(s) 904 to initiate, control, or perform one or more operations described with reference to FIGS. 1-6. To illustrate, the flight control computer(s) 118 include the autopilot system 120 that controls operation of the aircraft without pilot input, including control of rudder position.

In a particular implementation, the system memory 906 includes a non-transitory, computer readable medium storing the instructions that, when executed by the processor(s) 904, cause the processor(s) 904 to initiate, perform, or control operations to enable control of position of the rudder of the aircraft 800. The operations for the control system 104 include the operations identified in the method 600 of FIG. 6.

The one or more storage devices 908 include nonvolatile storage devices, such as magnetic disks, optical disks, or flash memory devices. In a particular example, the storage devices 908 include both removable and non-removable memory devices. The storage devices 908 are configured to store an operating system, images of operating systems, applications (e.g., one or more of the applications 918), and program data (e.g., the program data 916). In a particular aspect, the system memory 906, the storage devices 908, or both, include tangible computer-readable media (e.g., one or more storage devices) and are not merely signals. In a particular aspect, one or more of the storage devices 908 are external to the computing device 902.

The one or more input/output interfaces 910 enable the computing device 902 to communicate with one or more input/output devices 920 to facilitate user interaction. For example, the one or more input/output interfaces 910 can include a display interface, an input interface, or both. For example, the input/output interface 910 is adapted to receive input from a user (e.g., a pilot), to receive input from another computing device, or a combination thereof. In some implementations, the input/output interface 910 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device(s) 920 include one or more user interface devices and displays, including some combination of buttons, keyboards, pointing devices, instrument panel controls (e.g., dials, switches, slides, etc.), displays, speakers, microphones, touch screens, and other devices.

The processor(s) 904 are configured to communicate with devices or controllers 922 via the one or more communications interfaces 912. For example, the one or more communications interfaces 912 can include a network interface. The devices or controllers 922 can include, for example, one or more redundant flight control computers 118 of FIG. 1, subsystem computers, controllers, other devices of the aircraft, or combinations thereof.

In some implementations, a non-transitory, computer readable medium stores instructions that, when executed by one or more processors, cause the one or more processors to initiate, perform, or control operations to perform part or all of the functionality described above. For example, the instructions may be executable to implement one or more of the operations or methods of FIGS. 1-6. In some implementations, part, or all of one or more of the operations or methods of FIGS. 1-6 may be implemented by one or more processors (e.g., one or more central processing units (CPUs), one or more graphics processing units (GPUs), one or more digital signal processors (DSPs)) executing instructions, by dedicated hardware circuitry, or any combination thereof.

Particular aspects of the disclosure are described below in sets of interrelated Examples:

According to Example 1, a rudder system of an aircraft to control a position of a rudder, includes a first shaft assembly and a second shaft assembly, wherein each of the first shaft assembly and the second shaft assembly comprises: a shaft; a trim crank coupled to the shaft and configured such that rotation of the trim crank causes rotation of the shaft; and a pedal crank coupled to the shaft and configured such that rotation of the pedal crank causes rotation of the shaft without rotation of the trim crank; a pedal input link configured to couple the pedal crank of the first shaft assembly and the pedal crank of the second shaft assembly together; and a rudder trim link configured to couple the trim crank of the first shaft assembly and the trim crank of the second shaft assembly together.

Example 2 includes the rudder system of Example 1, wherein the rudder trim link comprises a mechanical link between the trim crank of the first shaft assembly and the trim crank of the second shaft assembly.

Example 3 includes the rudder system of Example 2, wherein the mechanical link comprises one or more rods, one or more cables, or combinations thereof.

Example 4 includes the rudder system of any of Examples 1 to 3, wherein the rudder trim link comprises an electrical and mechanical link.

Example 5 includes the rudder system of Example 4, wherein the electrical and mechanical link includes: wiring that electrically couples a trim actuator of the first shaft assembly to a second drive of the second shaft assembly; and a second control rod that connects the second drive to the trim crank of the second shaft assembly.

Example 6 includes the rudder system of Example 5, wherein each of the trim actuator and the second drive comprise a low gear ratio motor.

Example 7 includes the rudder system of any of Examples 1 to 6, wherein each of the first shaft assembly and the second shaft assembly includes a centering unit, and wherein each centering unit includes one or more bias members.

Example 8 includes the rudder system of Example 7, wherein the one or more bias members of the centering unit of the first shaft assembly are configured to cause rotation of the shaft of the first shaft assembly to a first position corresponding to a rudder trim position of the rudder in response to rotation of the trim crank of the first shaft assembly.

Example 9 includes the rudder system of Example 7, wherein the one or more bias members of the first shaft assembly comprise one or more springs, one or more elastic members, or combinations thereof.

Example 10 includes the rudder system of any of Examples 7 to 9, wherein: the one or more bias members of the first shaft assembly are configured to resist rotation of the shaft of the first shaft assembly from a first position corresponding to a rudder trim position of the rudder due to application of a second force to the shaft that rotates the shaft; the first position of the shaft is established by a position of the trim crank of the first shaft assembly; and the one or more bias members are configured to return the shaft toward the first position in response to reduction of the second force.

Example 11 includes the rudder system of Example 10, wherein the second force is configured to be applied to the shaft via the pedal crank due to pilot input to a pedal or via a backdrive crank due to activation of a backdrive actuator.

Example 12 includes the rudder system of any of Examples 7 to 11, wherein the centering unit of the first shaft assembly comprises: a cam coupled to the shaft of the first shaft assembly, wherein the cam includes a travel path for a follower of the trim crank of the first shaft assembly, and wherein the shaft is in a first position corresponding to a rudder trim position of the rudder when the follower is positioned in a detent of the travel path; and the trim crank of the first shaft assembly, wherein the trim crank includes: a second arm and a third arm; a follower assembly pivotally coupled to the second arm, wherein the follower assembly includes the follower; and the one or more bias members coupled to the follower assembly and the third arm and configured such that application of a second force to the shaft, via the pedal crank due to pilot input to a pedal or via a backdrive crank due to activation of a backdrive actuator, causes rotation of the cam, movement of the follower along the travel path, and application by the one or more bias members of a first force to the shaft via the follower and the cam, and wherein the first force resists the second force.

Example 13 includes the rudder system of Example 12, wherein: the centering unit of the second shaft assembly comprises a second cam; the second cam includes a second travel path with a detent in a middle portion of the second travel path; a trim crank of the second shaft assembly includes a follower positioned on the second travel path; and a shape of the travel path of the cam of the first shaft assembly is different than a shape of the second travel path.

According to Example 14, an aircraft includes a first shaft assembly and a second shaft assembly, wherein each of the first shaft assembly and the second shaft assembly comprises: a shaft; a trim crank coupled to the shaft and configured such that rotation of the trim crank causes rotation of the shaft; and a pedal crank coupled to the shaft and configured such that rotation of the pedal crank causes rotation of the shaft without rotation of the trim crank; a pedal input link configured to couple the pedal crank of the first shaft assembly and the pedal crank of the second shaft assembly together; a rudder trim link configured to couple the trim crank of the first shaft assembly and the trim crank of the second shaft assembly together; and a control system configured to receive first signals from one or more sensors of the first shaft assembly, receive second signals from one or more sensors of the second shaft assembly, and cause a rudder command signal to be sent to one or more rudder actuators to adjust a position of a rudder of the aircraft based on the first signals and the second signals.

Example 15 includes the aircraft of Example 14, wherein the rudder trim link comprises a mechanical link between the trim crank of the first shaft assembly and the trim crank of the second shaft assembly.

Example 16 includes the aircraft of Example 14 or Example 15, wherein the rudder trim link comprises an electrical and mechanical link.

Example 17 includes the aircraft of any of Examples 14 to 16, wherein each of the first shaft assembly and the second shaft assembly includes a centering unit.

According to Example 18, a method for rudder control of an aircraft includes receiving input, at a control system, to change rudder trim of the aircraft to a particular rudder trim position; and sending a rudder trim command signal from the control system to a trim actuator of a first shaft assembly, wherein the rudder trim command signal causes the trim actuator to rotate a trim crank of the first shaft assembly, wherein a rudder trim link causes corresponding rotation of a trim crank of a second shaft assembly, and wherein each of the first shaft assembly and the second shaft assembly comprise: a shaft; the trim crank coupled to the shaft and configured such that rotation of the trim crank causes rotation of the shaft; a pedal crank coupled to the shaft and configured such that rotation of the pedal crank causes rotation of the shaft without rotation of the trim crank; and a pedal input link configured to couple the pedal crank of the first shaft assembly and the pedal crank of the second shaft assembly together.

Example 19 includes the method of Example 18, wherein the rudder trim link comprises a mechanical link between the trim crank of the first shaft assembly and the trim crank of the second shaft assembly.

Example 20 includes the method of Example 18 or Example 19, wherein the rudder trim link comprises wiring that electrically couples the trim actuator to a second drive of the second shaft assembly, and a control rod that connects the second drive to the trim crank of the second shaft assembly.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A rudder system of an aircraft to control a position of a rudder, comprising:
    a first shaft assembly and a second shaft assembly, wherein each of the first shaft assembly and the second shaft assembly comprises:
    a shaft;
    a trim crank coupled to the shaft and configured such that rotation of the trim crank causes rotation of the shaft; and
    a pedal crank coupled to the shaft and configured such that rotation of the pedal crank causes rotation of the shaft without rotation of the trim crank;
    a pedal input link configured to couple the pedal crank of the first shaft assembly and the pedal crank of the second shaft assembly together; and
    a rudder trim link configured to couple the trim crank of the first shaft assembly and the trim crank of the second shaft assembly together.

2. The rudder system of claim 1, wherein the rudder trim link comprises a mechanical link between the trim crank of the first shaft assembly and the trim crank of the second shaft assembly.

3. The rudder system of claim 2, wherein the mechanical link comprises one or more rods, one or more cable systems, or combinations thereof.

4. The rudder system of claim 1, wherein the rudder trim link comprises an electrical and mechanical link.

5. The rudder system of claim 4, wherein electrical and mechanical link includes:
    wiring that electrically couples a trim actuator of the first shaft assembly to a second drive of the second shaft assembly; and
    a second control rod that connects the second drive to the trim crank of the second shaft assembly.

6. The rudder system of claim 5, wherein each of the trim actuator and the second drive comprise a low gear ratio motor.

7. The rudder system of claim 1, wherein each of the first shaft assembly and the second shaft assembly includes a centering unit, and wherein each centering unit includes one or more bias members.

8. The rudder system of claim 7, wherein the one or more bias members of the centering unit of the first shaft assembly are configured to cause rotation of the shaft of the first shaft assembly to a first position corresponding to a rudder trim position of the rudder in response to implementation of a change of rudder trim position of the rudder.

9. The rudder system of claim 7, wherein the one or more bias members of the first shaft assembly comprise one or more springs, one or more elastic members, or combinations thereof.

10. The rudder system of claim 7, wherein:

the one or more bias members are configured to resist rotation of the shaft of the first shaft assembly from a first position corresponding to a rudder trim position of the rudder due to application of a second force to the shaft that rotates the shaft;

the first position of the shaft is established by a position of the trim crank of the first shaft assembly; and the one or more bias members are configured to return the shaft toward the first position in response to reduction of the second force.

11. The rudder system of claim 10, wherein the second force is configured to be applied to the shaft via the pedal crank due to pilot input to a pedal or via a backdrive crank due to activation of a backdrive actuator.

12. The rudder system of claim 7, wherein the centering unit of the first shaft assembly comprises:

a cam coupled to the shaft of the first shaft assembly, wherein the cam includes a travel path for a follower of the trim crank of the first shaft assembly, and wherein the shaft is in a first position corresponding to a rudder trim position of the rudder when the follower is positioned in a detent of the travel path; and the trim crank of the first shaft assembly, wherein the trim crank includes:

a second arm and a third arm;

a follower assembly pivotally coupled to the second arm, wherein the follower assembly includes the follower; and the one or more bias members coupled to the follower assembly and the third arm and configured such that application of a second force to the shaft, via the pedal crank due to pilot input to a pedal or via a backdrive crank due to activation of a backdrive actuator, causes rotation of the cam, movement of the follower along the travel path, and application by the one or more bias members of a first force to the shaft via the follower and the cam, and wherein the first force resists the second force.

13. The rudder system of claim 12, wherein:

the centering unit of the second shaft assembly comprises a second cam;

the second cam includes a second travel path with a detent in a middle portion of the second travel path;

a trim crank of the second shaft assembly includes a follower positioned on the second travel path; and a shape of the travel path of the cam of the first shaft assembly is different than a shape of the second travel path.

14. An aircraft comprising:

a first shaft assembly and a second shaft assembly, wherein each of the first shaft assembly and the second shaft assembly comprises:

a shaft;

a trim crank coupled to the shaft and configured such that rotation of the trim crank causes rotation of the shaft; and a pedal crank coupled to the shaft and configured such that rotation of the pedal crank causes rotation of the shaft without rotation of the trim crank;

a pedal input link configured to couple the pedal crank of the first shaft assembly and the pedal crank of the second shaft assembly together;

a rudder trim link configured to couple the trim crank of the first shaft assembly and the trim crank of the second shaft assembly together; and a control system configured to receive first signals from one or more sensors of the first shaft assembly, receive second signals from one or more sensors of the second shaft assembly, and cause a rudder command signal to be sent to one or more rudder actuators to adjust a position of a rudder of the aircraft based on the first signals and the second signals.

15. The aircraft of claim 14, wherein the rudder trim link comprises a mechanical link between the trim crank of the first shaft assembly and the trim crank of the second shaft assembly.

16. The aircraft of claim 14, wherein the rudder trim link comprises an electrical and mechanical link.

17. The aircraft of claim 14, wherein each of the first shaft assembly and the second shaft assembly includes a centering unit.

18. A method for rudder control of an aircraft comprising:

receiving input, at a control system, to change rudder trim of the aircraft to a particular rudder trim position; and sending a rudder trim command signal from the control system to a trim actuator of a first shaft assembly, wherein the rudder trim command signal causes the trim actuator to rotate a trim crank of the first shaft assembly, wherein a rudder trim link causes corresponding rotation of a trim crank of a second shaft assembly, wherein each of the first shaft assembly and the second shaft assembly comprise:

a shaft;

the trim crank coupled to the shaft and configured such that rotation of the trim crank causes rotation of the shaft; and a pedal crank coupled to the shaft and configured such that rotation of the pedal crank causes rotation of the shaft without rotation of the trim crank; and wherein the pedal crank of the first shaft assembly and the pedal crank of the second shaft assembly are coupled together by a pedal input link.

19. The method of claim 18, wherein the rudder trim link comprises a mechanical link between the trim crank of the first shaft assembly and the trim crank of the second shaft assembly.

20. The method of claim 18, wherein the rudder trim link comprises wiring that electrically couples the trim actuator to a second drive of the second shaft assembly, and a control rod that connects the second drive to the trim crank of the second shaft assembly.

* * * * *